United States Patent Office 3,153,636
Patented Oct. 20, 1964

3,153,636
POROUS BODIES OF CONTROLLED DENSITIES AND METHODS OF MAKING THEM
Peter L. Shanta, Wayne, Pa., and George L. Bartholomew, Niagara Falls, Donald G. Sturges, Youngstown, John J. McGahan, Grand Island, and Raymond A. Caine, Lewiston, N.Y., assignors to The Carborundum Company, Niagara Falls, N.Y., a corporation of Delaware
No Drawing. Filed Oct. 31, 1958, Ser. No. 770,907
13 Claims. (Cl. 252—478)

The present invention relates to porous refractory bodies and methods of manufacturing the same and to the raw batch mixtures employed in such manufacture.

One object of the present invention is to provide light weight refractory material that is simple to manufacture in a variety of shapes.

Another object of the invention is to provide porous refractory material of substantially uniform density, and having sufficient structural strength to permit handling, shipping, machining, and use.

Another object of the invention is to provide light weight thermal insulating nuclear shielding material of predetermined thermal neutron capture cross section.

Another obejct of the invention is to provide thermal insulating nuclear shielding material, in substantially any desired shape, and of substantially homogeneous structure, that is easy to manufacture.

A further object of the invention is to provide a simple manufacturing technique for the production of low density refractory bodies.

A related object of the invention is to provide a process for producing low density refractory bodies having substantially any desired shape and having structural strength within a wide range of desirable values, depending upon service temperature requirements.

Another object of the invention is to provide a versatile process for producing low weight nuclear shielding that can produce the shielding with a consistent thermal neutron capture cross section, good structural strength, high thermal insulation value, and in substantially any desired shape.

Still another object of the invention is to provide a versatile process for producing refractory bodies of controlled porosity, having bonds adapted for particular service temperature requirements, and providing optimum strength properties commensurate with the thermal properties of the particular bond.

Yet another object of the invention is to provide a process for producing porous bodies having porous bonds of silicon carbide. A related object of the invention is to provide self-bonded bodies of silicon carbide of predetermined porosity and pore size.

Other objects of the invention will be apparent hereinafter from the specification and from the recital of the appended claims.

In accordance with this invention, finely divided particles of a refractory material such as silicon carbide, boron carbide, or any of the hard metallic carbides, nitrides, borides or silicides, or materials capable of reacting during the process to form a hard metallic carbide, nitride, boride or silicide, are mixed with a carbonaceous binder such as a synthetic resin or a compound of resins and a pore-forming material such as small resinous spheres, foaming agents or the like, and the mixtures formed to a suitable shape and then heated. The heating may be carried only to the point of setting the binder, but it may be carried to the point of carbonizing the binders and/or the pore-forming material. Also, if desired, the carbon released during the carbonizing treatment may be combined with silicon or other materials or metals to form carbides or the like in the finished bodies.

In accordance with one preferred embodiment of the present invention, a light weight refractory body can be made by mixing together pore support members of small size, particulate refractory material, and a binder, casting the mixture, setting the binder, and then dressing if necessary. For relatively low temperature work, an organic resinous binder is used to provide relatively high strength. For an intermediate temperature range, the organic resinous binder, and other carbonizable materials, such as the pore support members, are carbonized, to provide a porous carbon network or matrix that forms a binder that is satisfactory for many minimum strength requiremens. For high temperature work, the carbon binder can be siliconized, in accordance with known techniques, to provide a silicon carbide bond having high strength and good refractory properties.

As pore support members, it is preferred to use spherical hollow bodies of a thermosetting resin, of small size. The binder is preferably a synthetic resin, selected according to the characteristics desired in the body.

The invention can be illustrated by describing a few of the several bodies that can be made, and the processes of producing them.

EXAMPLE 1

*Nuclear Shielding Material*

Shielding material having a minimum boron content of 0.54 gms./cc., an average density of 0.71 to 0.85 gms./cc., sufficient strength to permit normal shipping and processing operations without cracking, edge chipping, or crumbling, and that is readily machinable with standard tooling to close tolerances, is desirable for certain applications. A suitable shielding body may be made in the following manner.

A dry mix is made of 660 gms. of an epoxy-modified phenolic resin in dry powdered form and 660 gms. of hollow, thin-walled resin spheres made of a phenol-formaldehyde resin and filled with an inert gas consisting primarily of nitrogen. The resin is a thermosetting epoxy-modified phenolic resin sold by the Varcum Chemical Co., Niagara Falls, N.Y., under their trademark "Varcum 1933." The purpose of the resin is to function as a carbonizable temporary binder, and other equivalent resins can be used in place of that identified above. The resin spheres preferably are "Microballoon" spheres sold by the Bakelite Company, and having an average particle diameter of about 0.0017 inch, a diameter range of about 0.0002 to about 0.005 inch, and a bulk density in the range of 3 to 5 lbs. per cu. ft. "Microballoon" is a registered trademark of the Standard Oil Company of Ohio.

This dry mix is screened twice through a fine screen to break up any aggregates, then transferred to a V-blender. 4680 gms. of boron carbide, having a particle size of about 44 microns and less (−325 mesh), is added to the blender. Coarser particles can also be used and are frequently desirable because of their lower cost. The finer particles are more expensive, in general, but mix easily with the mobile phenolic spheres, and have less tendency to settle from the mixture. For optimum results, particle size should be below about 74 microns. The blender is operated for about 20 minutes to effect a gentle mixing of these dry, particulate materials. The mix is then transferred to a mold with as little vibration as possible, since the boron carbide has a strong tendency to settle.

The mixture in the mold is cured overnight at 280° F. to 325° F., and then fired at 800° C. to 1000° C. in an inert atmosphere, such as argon. A preferred firing schedule involves a temperature rise of 20° C. to 100° C. an hour, to about 950° C., and a holding period of four hours at 950° C., followed by gradual cooling. The fired piece may be dressed as needed.

To increase the boron content of the shielding, boron-enriched boron carbide may be substituted for the boron carbide, or, alternatively, the proportion of boron carbide can be increased. For example, satisfactory shielding, substantially the same density as that produced by the process just described, is obtained when the amount of boron carbide is increased 1% by weight and the amount of binder is decreased 1% by weight, both based on the weight of the raw batch. Bodies of satisfactory strength are obtained even though a lower proportion of resin binder is employed than in the process described. For example, satisfactory shielding is obtained from a raw batch comprising, by weight, 85.4% boron carbide, 9.4% phenolic spheres, and 5.2% of the resin binder. In general, however, the physical properties of the shielding deteriorate as the binder content decreases, and for most purposes the resin content of a batch of this type should not be less than about 5% by weight. For example, better physical properties are obtained when the raw batch comprises, by weight, 84.3% boron carbide, 9.4% phenolic spheres, and 6.3% resin binder.

Several specimens, prepared substantially according to the process just described in detail, were tested to determine their physical properties, and were found to exhibit several outstanding characteristics. Compressive strength averaged 800 p.s.i., ranging from 678 p.s.i. to 904 p.s.i. Impact strength was as high as 19 ft.-lbs. These specimens exhibited excellent thermal insulating properties.

In practicing the invention, it is preferred to use, as binders, phenolic resins, epoxies, polyesters, and epoxy-modified phenolic resins. However, other carbonizable thermo-setting resins may also be used, such as furane resins, amino resins, and the like. The resin selected should fire to a clean carbon residue, or should be fugitive if the carbon from the resin is not relied on to impart strength to the fired body, by providing a carbon bond. The spheres may also be formed from carbonizable, thermosetting resins; phenolic spheres are preferred because they are readily available.

To increase the density of the material somewhat, and to minimize settling where some handling of the raw batch is necessary, small amounts of liquid thermosetting resins can be incorporated in the raw batch. Suitable liquid resins for this purpose include, for example, liquid phenol-formaldehyde resins and resorcinol-formaldehyde resins. To facilitate blending, the resin may be dissolved in a volatile solvent such as, for example, furfural.

The process can also be practiced by molding and cold pressing raw batches made, for example, of boron carbide and phenolic spheres, and preferably, but not necessarily, with a liquid phenolic resin, furfural, furfural-cresol, creosote oil, or mixtures of these liquids, added to impart green strength; then firing the molded batch to form the carbon bond.

EXAMPLE 2

Low Density Silicon Carbide Refractory Material

Material that is suitable for very high temperature work can be made from raw batches similar to those described in detail above, but in which silicon carbide is substituted for boron carbide. In converting such a raw batch to a refractory body, the molded batch is fired as before to carbonize the resins present, and thereafter, the material is siliconized by any of the standard siliconizing techniques. Excess silicon may or may not be removed. By this technique, self-bonded silicon carbide bodies having a density on the order of 1.0 gms./cc., and even as low as 0.5 gms./cc., may be prepared.

For example, a raw batch may be prepared from finely divided silicon carbide, phenolic spheres, and polyvinyl alcohol as a binder. The use of the liquid binder facilitates molding in intricate shapes. Other suitable binders include the resins previously mentioned, polyurethanes, waxes, dextrine, and the like, many of which, like polyvinyl alcohol, dry at room temperature.

Upon firing, the polyvinyl alcohol or other binder is burned off, leaving either no residue or a minimum residual amount of carbon. Siliconizing can be accomplished by raising the temperature to siliconizing temperature while the material is in contact with a source of elemental silicon, such as, for example, finely divided silicon or silicon nitride.

By regulating the proportion of phenolic spheres, the density of the refractory material may be adjusted over a wide range. In the case of bodies consisting essentially of silicon carbide, a unique combination of characteristics is obtained, including excellent strength, good thermal insulation, excellent thermal shock resistance, excellent refractory properties, substantial chemical insertness, and light weight.

The same techniques can be employed to make high temperature refractory bodies of graphite or of other refractory carbides, such as, for example, titanium carbide; and of borides, nitrides, and powdered metals, either separated or in admixture, one or more with another. Complex shapes can be made in this manner, for example, from zirconium carbide, zirconium boride, and titanium boride. For high temperature applications, either a carbon bond or a silicon carbide bond may be employed. A silicon carbide bond is best employed in conjunction with those materials with which the silicon carbide forms a strong bond.

Refractory bodies made in this manner are particularly adapted for use in thermal and acoustic insulation, for leading edges of high velocity missiles and other high velocity parts, for insulating liners for jet and rocket engines, for high temperature gas filtration, and the like.

EXAMPLE 3

Low Density, High Strength Shielding Material

For many low temperature applications, a polyester or epoxy resin binder may be employed advantageously, with adequate curing but without firing, to provide an organic bonded material of low density, having a closed pore structure provided by the phenolic spheres. Material of this type, containing boron carbide is suitable, for example, for nuclear shielding where high temperatures are not encountered.

The particulate boron carbide, or other refractory or metallic material, is dispersed in a porous bond or matrix of the phenolic spheres and the resin binder. Such a matrix is often referred to as a syntactic foam, because of the unique nature of its porous structure; for example, each void space is enclosed within a thin-walled shell of phenolic resin, which in turn is encapsulated in or adhered to other particles by the resin binder.

Whenever the phenolic spheres are employed, they will ordinarily form a minor proportion of the raw batch mixture by weight, because of their extremely low density; but conversely, they usually occupy a major proportion of the volume of the mixture. Ordinarily, in nuclear shielding material, the boron compound will constitute the major proportion of the raw batch mixture.

EXAMPLE 4

Alternative Process for Low Density Refractory Materials

Instead of using phenolic spheres as pore support members, a pore forming carbonaceous material may be used, comprising in combination a foaming agent and a carbonizable thermosetting binder. For example, finely divided silicon carbide is mixed with a foaming agent and a carbonizable thermosetting resin. This mixture is poured in a mold and heated to cure the resin. Curing conditions are regulated according to the desired pore size, the particular foaming agent selected, and the resin.

The cured body is then carbonized, and preferably, siliconized, by a vapor-solid reaction using vaporized silicon, at 2100° C. to 2300° C.

The body obtained is a porous monolithic silicon carbide having unique physical properties. Density and thermal conductivity are controlled by porosity.

Graphite in various forms may be added to the raw batch as a filler in place of all or a portion of the silicon carbide. Upon siliconizing, the graphite is converted to silicon carbide to some extent, depending on the particle size and porosity of the graphite. In most cases silicon carbide-bonded graphite is formed.

The techniques described above have wide general utility in making porous bodies for a variety of purposes. For intermediate and high temperature applications, that is, for temperatures above about 300° F., carbon and silicon carbide bonds may be employed, and they are readily produced by using the techniques of this invention.

The particulate solid material that is dispersed in the porous bond may be a metal in powder form, or any of the "hard metals." The terms "hard metals" and "refractory hard metals" are used interchangeably herein to specify metals and the group of high-melting hard substances of metallic character which would be considered inorganic compounds on the basis of chemical composition alone, but which have typically metallic properties. Representatives of these materials are the refractory carbides of the transition metals of the fourth to sixth groups of the periodic system, such as, particularly, the carbides of tungsten, titanium, and tantalum. These carbides exhibit metallic luster, high thermal and electrical conductivities, high hardness values, high modulus of elasticity, high melting points, and chemical stability. Compounds of the same transition metals with other comparatively small nonmetal atoms, such as nitrogen, boron, and silicon, are classified in the same group. Other representative compounds include the compounds with carbon, nitrogen, boron, and silicon, respectively, of titanium, zirconium, hafnium, vanadium, chromium, tantalum, niobium (columbium), molybdenum, thorium, tungsten and uranium.

The term "carbonaceous" is used herein to designate a material that is a supplier of carbon, and that preferably is carbon, or a compound containing carbon and hydrogen and/or other volatile constituents. The term "carbonizable" is used to specify materials that, upon firing at temperatures at and above their decomposition temperatures, deposit carbon. Carbonizable materials may be fugitive, for example, clean burning, like polyvinyl alcohol, or may coke to leave a carbon residue. Carbonizing temperature for many of the thermosetting synthetic resins is in the range 800° C. to 1000° C.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention, or the limits of the appended claims.

We claim:

1. A method of manufacturing porous refractory bodies wherein solely an internal source of carbon is utilized to form a carbon matrix within said body and comprising the steps of mixing together finely divided particles of a refractory material selected from the group consisting of metallic carbides, nitrides, borides and silicides, and materials capable of reacting during heating to form a member of the group consisting of metallic carbides, nitrides, borides and silicides, and a carbonaceous binder which will impart a porous structure to the product when cured, the major portion of the mix, by weight, being the refractory material, forming the mix into a desired shape, and thereafter heating the said shape to a sufficient extent to carbonize the binder and deposit a matrix of carbon within the body.

2. A method of manufacturing a porous refractory body wherein solely an internal source of carbon is utilized to form a carbon matrix within said body and comprising the steps of mixing together finely divided particles of a refractory material and a carbonaceous binder in the form of hollow spheres of a synthetic resin, the major portion of the mix, by weight, being the refractory material, forming the mix into a desired shape, and thereafter heating the mixture to a sufficient extent to carbonize the binder and deposit a carbon matrix within said body.

3. A method of manufacturing a porous refractory body wherein solely an internal source of carbon is utilized to form a carbon matrix within said body and comprising the steps of mixing together finely divided particles of a refractory material, a carbonaceous binder and a pore-forming material, the major portion of the mix, by weight, being the refractory material, forming the mix into a desired shape, and thereafter heating the mix to a sufficient extent to carbonize the binder and form a carbon matrix within said body.

4. A method according to claim 3, in which the refractory material is selected from the group consisting of metallic carbides, nitrides, borides and silicides and materials capable of reacting during the heating operation to form metallic carbides, nitrides, borides and silicides.

5. A method according to claim 3, in which the binder is a synthetic resin.

6. A method according to claim 3, in which the pore-forming material is in the form of synthetic resin spheres up to about 0.005" in diameter.

7. A method according to claim 3, in which the pore-forming material is a foaming agent.

8. A method of manufacturing a porous refractory body wherein solely an internal source of carbon is utilized to form a carbon matrix within said body and comprising the steps of mixing together finely divided particles of a refractory material, a synthetic resin binder and a pore-forming material, the major portion of the mix, by weight, being the refractory material, forming the mix into a desired shape, and thereafter heating the mix to a sufficient extent to carbonize the binder and pore-forming material and form a carbon matrix within said body.

9. A method of manufacturing a porous refractory body wherein solely an internal source of carbon is utilized to form a carbon matrix within said body and comprising the steps of mixing together finely divided particles of a metallic carbide, a synthetic resin binder and small spheres of a synthetic resin, the major portion of the mix, by weight, being the refractory material, forming the mix into a desired shape, and thereafter heating the mix to a sufficient extent to carbonize the binder and form a carbon matrix within said body.

10. A raw batch for the manufacture of porous bodies of controlled density consisting essentially of finely divided particles of a refractory material selected from the group consisting of metallic carbides, nitrides, borides and silicides, a carbonaceous binder and a carbonaceous pore-forming material, the major portion of the mix, by weight, being the refractory material.

11. A raw batch according to claim 10, in which the carbonaceous binder is a synthetic resin.

12. A method of making nuclear shielding material wherein solely an internal source of carbon is utilized to form a carbon bond and comprising forming a raw batch mixture containing, in percentages, by weight based upon said mixture, a major proportion of boron carbide in finely divided form, a carbonizable thermosetting synthetic resin binder and a phenolic resin in the form of hollow spheres having a maximum diameter on the order of about 0.005", and firing the mixture at carbonizing temperatures to form a porous body comprising finely divided boron carbide in a porous bond consisting essentially of carbon.

13. A porous body consisting essentially of finely divided particles of a refractory material dispersed in a matrix of carbon, said matrix having a porous structure, the pore sizes being about 0.005" and less.

References Cited in the file of this patent

UNITED STATES PATENTS

| | | |
|---|---|---|
| 2,303,515 | Toepfer | Dec. 1, 1942 |
| 2,341,561 | Kinzie et al. | Feb. 15, 1944 |
| 2,553,759 | Greiger | May 22, 1951 |
| 2,583,160 | Thomas | Jan. 22, 1952 |
| 2,636,825 | Nicholson | Apr. 28, 1953 |
| 2,636,828 | Nicholson | Apr. 28, 1953 |
| 2,777,081 | Miner | Jan. 8, 1957 |
| 2,780,743 | Elsey | Feb. 5, 1957 |
| 2,796,411 | Zirkle | June 18, 1957 |
| 2,797,201 | Veatch et al. | June 25, 1957 |
| 2,806,509 | Bozzacco et al. | Sept. 17, 1957 |
| 2,858,451 | Silversher | Oct. 28, 1958 |
| 2,887,393 | Taylor | May 19, 1959 |
| 2,921,859 | Godron | Jan. 19, 1960 |

FOREIGN PATENTS

| | | |
|---|---|---|
| 716,422 | Great Britain | Oct. 6, 1954 |

OTHER REFERENCES

Morgan: "Designing Electronics to Resist Nuclear Energy," Electronics, May 1, 1957, pp. 155–157.